United States Patent
Hoffmann et al.

(10) Patent No.: US 9,951,245 B2
(45) Date of Patent: *Apr. 24, 2018

(54) COATING MATERIAL COMPOSITIONS AND LOW-TEMPERATURE-CURABLE COATINGS PRODUCED THEREFROM, AND USE THEREOF

(71) Applicant: BASF Coatings GmbH, Muenster (DE)

(72) Inventors: Peter Hoffmann, Senden (DE); Rainer Klopsch, Worms (DE); Matthijs Groenewolt, Muenster (DE); Elisabeth Wessling, Emsdetten (DE); Aaron Flores-Figueroa, Mannheim (DE); Kristin Michel, Sendenhorst (DE)

(73) Assignee: BASF Coatings GmbH, Muenster (DE)

( * ) Notice: Subject to any disclaimer, the term of this patent is extended or adjusted under 35 U.S.C. 154(b) by 86 days.

This patent is subject to a terminal disclaimer.

(21) Appl. No.: 15/023,903

(22) PCT Filed: Aug. 7, 2014

(86) PCT No.: PCT/EP2014/066969
§ 371 (c)(1),
(2) Date: Mar. 22, 2016

(87) PCT Pub. No.: WO2015/039803
PCT Pub. Date: Mar. 26, 2015

(65) Prior Publication Data
US 2016/0215163 A1    Jul. 28, 2016

(30) Foreign Application Priority Data

Sep. 23, 2013 (EP) .................................... 13185581

(51) Int. Cl.
| | | |
|---|---|---|
| *B05D 3/02* | (2006.01) | |
| *B05D 7/16* | (2006.01) | |
| *C08F 8/32* | (2006.01) | |
| *C08F 220/08* | (2006.01) | |
| *C09D 133/00* | (2006.01) | |
| *C09D 133/14* | (2006.01) | |
| *C08F 8/00* | (2006.01) | |
| *C08G 12/02* | (2006.01) | |
| *C09D 173/00* | (2006.01) | |
| *C08G 71/04* | (2006.01) | |
| *B05D 7/00* | (2006.01) | |
| *C08F 220/28* | (2006.01) | |

(52) U.S. Cl.
CPC ........... *C09D 133/14* (2013.01); *B05D 7/574* (2013.01); *C08F 8/00* (2013.01); *C08F 8/32* (2013.01); *C08F 220/28* (2013.01); *C08G 12/02* (2013.01); *C08G 71/04* (2013.01); *C09D 173/00* (2013.01); *C08F 220/08* (2013.01); *C09D 133/00* (2013.01)

(58) Field of Classification Search
CPC ........ C08F 224/00; C08F 8/32; C08F 220/08; C08L 37/00; C09D 133/00

USPC .......................................................... 526/269
See application file for complete search history.

(56) References Cited

U.S. PATENT DOCUMENTS

| | | | |
|---|---|---|---|
| 4,882,391 | A | 11/1989 | Brindoepke et al. |
| 5,240,835 | A | 8/1993 | Pettrone et al. |
| 5,374,699 | A | 12/1994 | Iwamura et al. |
| 5,393,855 | A | 2/1995 | Iwamura et al. |
| 5,567,527 | A | 10/1996 | Webster et al. |
| 9,062,136 | B2 * | 6/2015 | Porta Garcia ........... C08F 24/00 |

FOREIGN PATENT DOCUMENTS

| | | |
|---|---|---|
| DE | 1 098 953 B | 2/1961 |
| DE | 34 33 403 A1 | 3/1986 |
| DE | 10 2009 003 035 | 11/2010 |
| EP | 0 274 721 A2 | 7/1988 |
| EP | 0 692 007 A1 | 1/1996 |
| EP | 0 837 062 A1 | 4/1998 |
| EP | 1 448 619 A1 | 8/2004 |
| JP | 2006-137733 A | 6/2006 |

(Continued)

OTHER PUBLICATIONS

International Search Report dated Nov. 11, 2014 in PCT/EP2014/066969 filed on Aug. 7, 2014.

*Primary Examiner* — Ramsey E Zacharia
(74) *Attorney, Agent, or Firm* — Oblon, McClelland, Maier & Neustadt, L.L.P.

(57) ABSTRACT

The present invention relates to a nonaqueous coating material composition comprising at least one compound (A) having at least two amino groups and at least one oligomeric and/or polymeric compound (B) having at least two alkylidene-1,3-dioxolan-2-one groups. Compound (B) is obtained using at least one monomer (B1) of formula (I)

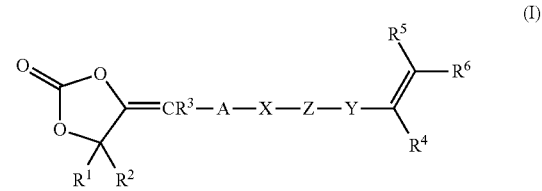

where $R^1$-$R^6$, A, X, Z, and Y are as set forth in the specification and at least two different comonomers (B2) and (B3) which are each different from the monomer (B1). The present invention further provides the coatings produced from these coating material compositions, and also the use thereof.

16 Claims, No Drawings

(56) References Cited

FOREIGN PATENT DOCUMENTS

| | | |
|---|---|---|
| JP | 2008-222619 A | 9/2008 |
| WO | 96/26224 A1 | 8/1996 |
| WO | 2004/005088 A1 | 1/2004 |
| WO | 2011/157671 A1 | 12/2011 |
| WO | 2012/123161 | 9/2012 |
| WO | 2012/123166 A1 | 9/2012 |
| WO | 2012/123198 | 9/2012 |
| WO | 2012/126796 A1 | 9/2012 |
| WO | 2012/130718 A1 | 10/2012 |
| WO | 2013/110712 A1 | 8/2013 |
| WO | 2013/144299 A1 | 10/2013 |

\* cited by examiner

COATING MATERIAL COMPOSITIONS AND LOW-TEMPERATURE-CURABLE COATINGS PRODUCED THEREFROM, AND USE THEREOF

The present invention relates to nonaqueous coating material compositions comprising at least one polyamino group-containing compound (A) and at least one compound (B) having at least two alkylidene-1,3-dioxolan-2-one groups. The present invention further provides the coatings produced from these coating material compositions, and the use thereof, more particularly for automotive OEM finishing, automotive refinish, and the coating of parts for installation in or on vehicles, and also of plastics.

Coating material compositions based on polyurethanes (PU) find use in countless fields, more particularly for automotive OEM finishing and automotive refinish. Common to all such polyurethanes is that they are prepared by polyaddition reaction of polyamines or polyols with polyfunctional isocyanates. Through skilled selection of the polyamine and/or polyol component it is possible to tailor the profile of properties of the polyurethane obtained.

A disadvantage found is the high reactivity of the polyfunctional isocyanates, leading to a high sensitivity to moisture. While polyfunctional isocyanates can be stored for some considerable time under water-free conditions, the reaction with water occurs in the course of curing, hence necessitating very dry operation. Beyond the sensitivity to moisture, the aromatic isocyanates in particular tend toward discolorations. Another problem is the health concerns raised by certain diisocyanates. Thus it is known that diisocyanates may trigger allergies on skin contact or inhalation. For this reason, oligomers of diisocyanates have been developed that are easier to handle on account of their lower volatility. Nevertheless, there is a fundamental demand for alternatives to the polyisocyanates known from the prior art.

Alkylidene-1,3-dioxolan-2-ones, also referred to below as exo-vinylene carbonates, have been described at various points in the literature, as for example in DE 1098953, DE 3433403, EP 837062, JP 2006137733, JP 2008222619, J. Org. Chem. 2007, 72, 647-649, Angew. Chem. 2009, 121, 4258-4261, Eur. J. Org. Chem. 2007, 2604-2607, Eur. J. Org. Chem. 2008, 2309-2312, and Org. Lett. 2006, 8, 515-518. Alkylidene-1,3-dioxolan-2-ones are proposed therein as synthesis building blocks for the preparation of active ingredients and effect substances.

WO 2011/157671 describes the use of alkylidene-1,3-dioxolan-2-ones together with aminic hardeners as additives in epoxy resin compositions.

WO 96/26224 describes the copolymerization of 4-vinyl-1,3-dioxolan-2-ones with ethylenically unsaturated comonomers. The polymers obtained in this reaction have 1,3-dioxolan-2-one groups and are used together with amino-functional crosslinkers for the production of coatings.

EP-B-1 448 619 disclose 4-(meth)acryloyloxyalkyl-1,3-dioxolan-2-ones which are polymerized with ethylenically unsaturated comonomers to form copolymers which have 1,3-dioxolane-2-one groups bonded via alkyloxycarbonyl units. The polymers are reacted with aminic compounds, giving graft polymers which have urethane groups and hydroxyl groups. The graft polymers are used in coating materials, more particularly clearcoats, which are cured by means of customary compounds having reactive groups, such as hydroxyl groups, amino groups, isocyanate groups, epoxy groups, silane groups, acetoacetate groups, vinyl groups, and acrylate groups, at elevated temperatures.

WO 2012/130718, moreover, discloses polymers based on (2-oxo-1,3-dioxolan-4-yl)methyl acrylate and (2-oxo-1,3-dioxolan-4-yl)methyl methacrylate, which are used together with diamines or polyamines in coating material compositions.

However, the reactivity of the polymers with 1,3-dioxolan-2-one groups that are known from the prior art is unsatisfactory. In the reaction of 1,3-dioxolan-2-ones with, for example, amines or alcohols, moreover, hydroxyl groups are formed, which may prove disadvantageous in a variety of applications.

The as yet unpublished international patent application PCT/EP2013/056716 describes polymerizable alkylidene-1,3-dioxolan-2-one monomers, their preparation, and their use for producing the corresponding homopolymers or copolymers, and also the use thereof as crosslinker component in 2K [two-component] coating material compositions. For the crosslinking of these carbonate group-containing polymers, amino group-containing compounds, in particular, are used besides hydroxyl group-containing compounds. In the case of the copolymers, however, in each case only one other comonomer can be used together with the alkylidene-1,3-dioxolan-2-one monomer.

OBJECT

It was an object of the present invention, therefore, to provide coating material compositions which for curing require no addition of polyisocyanates and no addition of melamine-formaldehyde resins. Furthermore, the coating material compositions ought to have a good reactivity, thus ensuring sufficient crosslinking of the resultant coating under the curing conditions customary in the automotive OEM finishing and automotive refinish segments and also in the segment of the finishing of commercial vehicles and of parts for installation in and on automobiles.

Furthermore, the coating material compositions ought to lead to coatings which have as little inherent coloring as possible—particularly in the case of overbaking—or, if inherent coloring does occur during overbaking, said inherent coloring ought to be reversible.

Furthermore, the coating material compositions ought also to meet the requirements typically imposed on the clearcoat film in automotive OEM finishing and automotive refinish.

Lastly, the coating material compositions ought to be able to be produced easily and extremely reproducibly, and ought not to give rise to any environmental problems during coating-material application.

ACHIEVEMENT OF THE OBJECT

In the light of the above-stated objective, nonaqueous coating material compositions have been found, comprising (A) at least one polyamino group-containing compound (A) and (B) at least one oligomeric and/or polymeric compound (B) having at least two alkylidene-1,3-dioxolan-2-one groups, wherein
the compound (B) is obtainable using
i. at least one monomer (B1) of the formula (I)

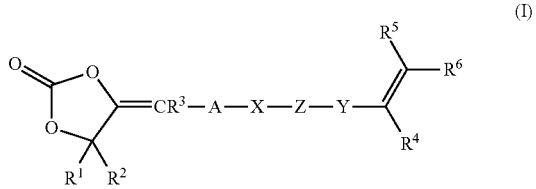

(I)

where
R$^1$, R$^2$ independently of one another are hydrogen, C$_1$-C$_6$ alkyl, C$_1$-C$_4$ alkoxy-C$_1$-C$_4$ alkyl, C$_5$-C$_6$ cycloalkyl, phenyl or phenyl-C$_1$-C$_4$ alkyl;
R$^3$ is hydrogen, C$_1$-C$_6$ alkyl, C$_1$-C$_4$ alkoxy-C$_1$-C$_4$ alkyl, C$_5$-C$_6$ cycloalkyl, phenyl, or phenyl-C$_1$-C$_4$ alkyl, R$^3$ more particularly being hydrogen;
R$^4$ is hydrogen, C$_1$-C$_4$ alkyl, CH$_2$COOR$^8$, phenyl or phenyl-C$_1$-C$_4$ alkyl;
R$^5$, R$^6$ independently of one another are hydrogen or C$_1$-C$_4$ alkyl or else one of the radicals, R$^5$ or R$^6$, may be COOR$^8$ or CH$_2$COOR$^8$;
A is a chemical bond or C$_1$-C$_4$ alkanediyl, A more particularly being C$_1$-C$_4$ alkanediyl;
X is O or NR$^7$;
Z is a chemical bond, PO$_2$, SO$_2$, or C=O, Z more particularly being C=O;
Y is a chemical bond, CH$_2$, or CHCH$_3$, Y more particularly being a chemical bond;
R$^7$ where present is C$_1$-C$_6$ alkyl; and
R$^8$ where present is hydrogen or C$_1$-C$_6$ alkyl;
and
ii. at least two different comonomers (B2) and (B3) which are each different from the monomer (B1).

The present invention additionally provides multistage coating methods using these coating material compositions, and also the use of the coating material compositions as clearcoat and application of the coating method for automotive OEM finishing, for automotive refinishing and/or for the coating of parts for installation in or on automobiles, of plastics substrates and/or of commercial vehicles.

It has now been found that the compounds (B) which have at least two alkylidene-1,3-dioxolan-2-one groups of the formula (I') have a reactivity which is increased markedly relative to the prior-art polymers with 1,3-dioxolan-2-one groups such that with amino group-containing curing agents, under the curing conditions customary in the segment of automotive OEM finishing and OEM automotive refinish, and also in the segment of the finishing of parts for installation in or on automobiles, and commercial vehicles, they ensure sufficient crosslinking of the resultant coating.

A further feature of the coating material compositions of the invention is that for curing they require no addition of polyisocyanates and no addition of melamine-formaldehyde resins, and therefore that the environmental problems associated with these toxic and/or irritant compounds, particularly during coating-material application, can be avoided.

In addition, the coating material compositions lead to coatings which surprisingly have a considerably lesser inherent color—especially in the case of overbaking—than the coating material compositions based on the known glyceryl carbonate acrylate copolymer. However, particularly in the automotive finishing segment, the specifications of the automobile manufacturers dictate extremely low yellowing levels, which are not achieved in the case of overbaking, even with the coating compositions of the invention, directly after baking. Surprisingly, however, it has been found that the thermal yellowing of the coatings of the invention is completely reversible by exposure to daylight within 24 hours, thereby allowing the coating material compositions of the invention to be employed for automobile finishing. This exposure to daylight is simulated using the so-called Suntest with daylight filter, in which a high-pressure xenon lamp as radiation source mimics the distribution and intensity of sunlight radiation in the wavelength range from 270 to 800 nm under laboratory conditions ("SUNTEST" instrument from Heraeus Instruments; radiation source: high-pressure xenon lamp, 1800 watts, air-cooled, Suprax filter).

Furthermore, the coating material compositions also meet the requirements typically imposed on the clearcoat film in automotive OEM finishing and automotive refinish.

Lastly, the coating material compositions can be produced easily and with very good reproducibility.

DESCRIPTION OF THE INVENTION

The Coating Materials of the Invention

For the purposes of the present invention, unless otherwise indicated, constant conditions were selected in each case for the determination of nonvolatile fractions (NVF, solids). To determine the nonvolatile fraction, an amount of 1 g of the respective sample is applied to a solid lid and heated at 130° C. for 1 h, then cooled to room temperature and weighed again (in accordance with ISO 3251). Determinations were made of the nonvolatile fraction of, for example, corresponding polymer solutions and/or resins present in the coating composition of the invention, in order thereby to adjust the weight fraction of the respective constituent in a mixture of two or more constituents, or of the overall coating material composition, and allow it to be determined.

If polyamines are used as component (A) that are liquid under atmospheric pressure of 1013 mbar and at 25° C., then all of the weight figures given below, and all binder fractions specified for component (A), are based on the pure active substance without solvent. This pure active substance constitutes the polyamine (A) weighed out, without solvent. If component (A) is used in the form of a dilute solution of a liquid polyamine, then the binder fraction of component (A) is determined arithmetically from the concentration specified for the solution.

The mass-average (Mw) and number-average (Mn) molecular weight is determined for the purposes of the present invention by means of gel permeation chromatography at 35° C., using a high-performance liquid chromatography pump and a refractive index detector. The eluent used was tetrahydrofuran, containing 0.1 vol % acetic acid, with an elution rate of 1 ml/min. The calibration is carried out by means of polystyrene standards.

The Polyamino Group-Containing Compound (A)

As polyamino group-containing compound (A) it is possible to use all compounds known to the skilled person which have at least two amino groups per molecule.

The aminic hardeners (A) include, for example, aliphatic and cycloaliphatic polyamines, aromatic and araliphatic polyamines, and also polymeric amines, such as aminoplast resins and polyamidoamines. Amine curing agents crosslink polymers with 1,3-dioxolan-2-one groups, also referred to below as carbonate polymers, by reaction of the primary or secondary amino functions of the polyamines with the 1,3-dioxolan-2-one groups of the carbonate polymers, to form urethane functions.

Preferred polyamino group-containing compounds (A) have on average at least two primary and/or secondary amino groups per molecule, as for example two, three, or four primary or secondary amino groups per molecule. They may also, additionally, contain one or more tertiary amino groups. Examples of suitable polyamines are

- aliphatic polyamines such as ethylenediamine, 1,2- and 1,3-propanediamine, neopentanediamine, hexa-methylenediamine, octamethylenediamine, 1,10-diaminodecane, 1,12-diaminododecane, diethylenetriamine, triethylenetetramine, tetraethylenepentamine, trimethylhexamethylenediamine, dimethylpropylenediamine, 1-(3-aminopropyl)-3-aminopropane, 1,3-bis(3-aminopropyl)propane, 4-ethyl-4-methylamino-1-octylamine, and the like;
- cycloaliphatic diamines such as 1,2-diaminocyclohexane, 1,3-bis(aminomethyl)cyclohexane, 1-methyl-2,4-diaminocyclohexane, 4-(2-aminopropan-2-yl)-1-methylcyclohexan-1-amine, isophoronediamine, 4,4'-diaminodicyclohexylmethane, 3,3'-dimethyl-4,4'-diaminodicyclohexylmethane, 4,8-diaminotricyclo[5.2.1.0]-decane, norbornanediamine, menthanediamine, menthenediamine, and the like;
- aromatic diamines such as tolylenediamine, xylylenediamine, more particularly meta-xylylenediamine, bis(4-aminophenyl)methane (MDA or methylenedianiline), bis(4-aminophenyl) sulfone (also known as DADS, DDS or dapsone), and the like;
- cyclic polyamines such as piperazine, N-amino-ethylpiperazine, and the like;
- polyetheramines, more particularly difunctional and trifunctional primary polyetheramines based on polypropylene glycol, polyethylene glycol, polybutylene oxide, poly(1,4-butanediol), polytetrahydrofuran (poly THF) or polypentylene oxide, e.g., 4,7,10-trioxatridecane-1,3-diamine, 4,7,10-trioxatridecane-1,13-diamine, 1,8-diamino-3,6-dioxaoctane (XTJ-504, Huntsman), 1,10-diamino-4,7-dioxadecane (XTJ-590, Huntsman), 1,12-diamino-4,9-dioxadodecane (BASF SE), 1,3-diamino-4,7,10-trioxatridecane (BASF SE), primary polyetheramines based on polypropylene glycol with an average molar mass of 230 such as, for example, Polyetheramine D 230 (BASF SE) or Jeffamine® D 230 (Huntsman), difunctional, primary polyetheramines based on polypropylene glycol with an average molar mass of 400, e.g., Polyetheramine D 400 (BASF SE) or Jeffamine® XTJ 582 (Huntsman), difunctional, primary polyetheramines based on polypropylene glycol with an average molar mass of 2000 such as, for example, polyetheramine D 2000 (BASF SE), Jeffamine® D2000 or Jeffamine® XTJ 578 (each Huntsman), difunctional, primary polyetheramines based on propylene oxide with an average molar mass of 4000 such as, for example, Polyetheramine D 4000 (BASF SE), trifunctional, primary polyetheramines prepared by reacting propylene oxide with trimethylolpropane, followed by amination of the terminal OH groups with an average molar mass of 403 such as, for example, polyetheramine T 403 (BASF SE) or Jeffamine® T 403 (Huntsman), trifunctional, primary polyetheramines, prepared by reacting propylene oxide with glycerol, followed by amination of the terminal OH groups, with an average molar mass of 5000 such as, for example, Polyetheramine T 5000 (BASF SE) or Jeffamine® T 5000 (Huntsman), aliphatic polyetheramines constructed of a polyethylene glycol grafted with propylene oxide, and having an average molar mass of 600, such as, for example, Jeffamine® ED-600 or Jeffamine® XTJ-501 (each Huntsman), aliphatic polyetheramines constructed of a polyethylene glycol grafted with propylene oxide, and having an average molar mass of 900, such as, for example, Jeffamine® ED-900 (Huntsman), aliphatic polyetheramines constructed of a polyethylene glycol grafted with propylene oxide, and having an average molar mass of 2000, such as, for example, Jeffamine® ED-2003 (Huntsman), difunctional, primary polyetheramines prepared by aminating a diethylene glycol grafted with propylene oxide and having an average molar mass of 220, such as, for example, Jeffamine® HK-511 (Huntsman), aliphatic polyetheramines based on a copolymer of poly(tetramethylene ether glycol) and polypropylene glycol with an average molar mass of 1000 such as, for example, Jeffamine® XTJ-542 (Huntsman), aliphatic polyetheramines based on a copolymer of poly(tetramethylene ether glycol) and polypropylene glycol with an average molar mass of 1900 such as, for example, Jeffamine® XTJ-548 (Huntsman), aliphatic polyetheramines based on a copolymer of poly-(tetramethylene ether glycol) and polypropylene glycol with an average molar mass of 1400 such as, for example, Jeffamine® XTJ-559 (Huntsman), polyethertriamines based on an at least trihydric alcohol grafted with butylene oxide and with an average molar mass of 400, such as, for example, Jeffamine® XTJ-566 (Huntsman), aliphatic polyetheramines prepared by aminating alcohols grafted with butylene oxide and having an average molar mass of 219 such as, for example, Jeffamine® XTJ-568 (Huntsman), polyetheramines based on pentaerythritol and propylene oxide with an average molar mass of 600 such as, for example, Jeffamine® XTJ-616 (Huntsman), polyetheramines based on triethylene glycol with an average molar mass of 148, e.g., Jeffamine® EDR-148 (Huntsman), difunctional, primary polyetheramines, prepared by aminating an ethylene glycol grafted with propylene oxide and having an average molar mass of 176 such as, for example, Jeffamine® EDR-176 (Huntsman), and also polyetheramines prepared by aminating polytetrahydrofuran (poly THF) with an average molar mass of 250, e.g., PolyTHF-Amine 350 (BASF SE), and mixtures of these amines;
- polyamidoamines (amidopolyamines), which are obtainable through the reaction of dimeric fatty acids (e.g., dimeric linoleic acid) with low molecular mass polyamines such as diethylenetriamine, 1-(3-aminopropyl)-3-aminopropane or triethylenetetramine, or other diamines, such as the aforementioned aliphatic or cycloaliphatic diamines;
- adducts obtainable through reaction of amines, more particularly diamines, with a substoichiometric amount of epoxy resin and/or reactive diluent, the adducts used being preferably those in which about 5% to 20% of the epoxide groups have undergone reaction with amines, more particularly diamines;
- phenalkamines, as known from epoxide chemistry;
- Mannich bases, prepared for example by condensing polyamines, preferably diethylenetriamine, triethylenetetramine, isophoronediamine, 2,2,4- and/or 2,4,4-trimethylhexamethylenediamine, 1,3- and 1,4-bis-(aminomethyl) cyclohexane with aldehydes, preferably formaldehyde and monohydric or polyhydric phenols having at least one aldehyde-reactive ring location, examples being the various cresols and xylenols, diphenylmethane, 4,4'-dihydroxydiphenyl-2,2-propane, but preferably phenol;
and also mixtures of the aforementioned amine curing agents.

The polyamino group-containing compound (A) is preferably selected from the group of (cyclo)aliphatic diamines, (cyclo) aliphatic triamines and/or polyetheramines.

As component (A) it is also possible to use mixtures of different monomeric, oligomeric and/or polymeric polyamines. Used more particularly as component (A) are mixtures of different aliphatic diamines and/or aliphatic triamines, mixtures of different cycloaliphatic diamines and/or cycloaliphatic triamines, and mixtures of different aliphatic diamines and/or aliphatic triamines with cycloaliphatic diamines and/or cycloaliphatic triamines. Used further with preference are polyetheramines, more particularly difunctional and trifunctional primary polyetheramines based on propylene oxide, more preferably trifunctional primary polyetheramines prepared by reaction of propylene oxide with trimethylolpropane, followed by amination of the terminal OH groups.

The coating material of the invention preferably comprises from 3 to 30 wt %, more preferably from 5 to 25 wt %, of at least one polyamino group-containing compound (A),
the wt % figures being based in each case on the binder fraction of the coating material [in other words based on the total weight of the binder fraction of the compounds (B) of the invention, plus the binder fraction of the polyamine (A), plus weight of the catalyst (D) optionally used].

The Compounds (B) Having at Least Two Alkylidene-1,3-Dioxolan-2-One Groups of the Formula (I')

It is essential to the invention that the compounds (B) used in accordance with the invention contain at least two alkylidene-1,3-dioxolan-2-one groups of the formula (I'):

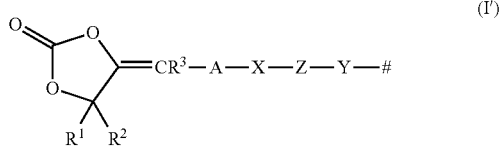

where # stands for the attachment to the polymer backbone and $R^1$, $R^2$ independently of one another are hydrogen, $C_1$-$C_6$ alkyl, $C_1$-$C_4$ alkoxy-$C_1$-$C_4$ alkyl, $C_5$-$C_6$ cycloalkyl, phenyl or phenyl-$C_1$-$C_4$ alkyl;

$R^3$ is hydrogen, $C_1$-$C_6$ alkyl, $C_1$-$C_4$ alkoxy-$C_1$-$C_4$ alkyl, $C_5$-$C_6$ cycloalkyl, phenyl, or phenyl-$C_1$-$C_4$ alkyl, $R^3$ more particularly being hydrogen;

A is a chemical bond or $C_1$-$C_4$ alkanediyl, A more particularly being $C_1$-$C_4$ alkanediyl;

X is O or $NR^7$;

Z is a chemical bond, $PO_2$, $SO_2$, or C=O, Z more particularly being C=O;

Y is a chemical bond, $CH_2$, or $CHCH_3$, Y more particularly being a chemical bond; and $R^7$ where present is $C_1$-$C_6$ alkyl.

In combination with the amino group-containing compounds (A), such compounds (B) have a high reactivity, without possessing the disadvantages associated with iso-cyanates. They are therefore particularly suitable as replacements for polyfunctional isocyanates in numerous applications, more particularly for coating material compositions for automotive OEM finishing, for automotive refinish, and for the coating of parts for installation in or on vehicles, and of plastics.

It has surprisingly been found that the compounds (B), described in more detail below, can be prepared by polymerization using ethylenically unsaturated monomers which have an alkylidene-1,3-dioxolane-2-one group and a further ethylenically unsaturated double bond, with retention of the alkylidene-1,3-dioxolan-2-one group. This is surprising since at various points in the literature it is described how the methylene group in methylene-1,3-dioxolan-2-ones undergoes polymerization under radical conditions—see, for example, Journal of Network Polymer, Japan 2005, 26, 132-137, Makromol. Chem., Rapid Commun. 1989, 10, 453-456.

The compounds (B) used according to the invention are therefore obtainable using at least one monomer (B1) of the formula (I)

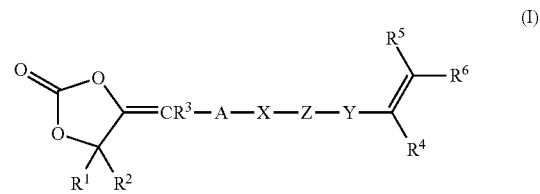

wherein $R^1$, $R^2$, $R^3$, $R^4$, $R^5$, $R^6$, A, X, Z, Y, $R^7$, and $R^8$ have the definition stated in claim 1, and at least two different comonomers (B2) and (B3) which are each different from monomer (B1).

Here and below, the prefix "$C_n$-$C_m$" used for defining substituents and chemical compounds indicates the number of possible C atoms in the substituent or compound, respectively.

Unless indicated otherwise, the following general definitions are valid, for the purposes of the present invention, for the terms used in connection with the substituents:

"Alkyl" stands for a linear or branched alkyl radical having for example 1 to 4 ($C_1$-$C_4$ alkyl), 1 to 6 ($C_1$-$C_6$ alkyl), or 1 to 20 carbon atoms ($C_1$-$C_{20}$ alkyl). Examples of $C_1$-$C_4$ alkyl are methyl, ethyl, n-propyl, isopropyl, n-butyl, 2-butyl, isobutyl and tert-butyl (2-methylpropan-2-yl). Examples of $C_1$-$C_6$ alkyl, in addition to the definitions stated for $C_1$-$C_4$ alkyl, are also n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. Examples of $C_1$-$C_{20}$ alkyl, in addition to the definitions stated for $C_1$-$C_6$ alkyl, are also heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, and their constitutional isomers.

"$C_1$-$C_4$ Alkoxy-$C_1$-$C_4$ alkyl" stands for an alkyl group which has 1 to 4 carbon atoms and is bonded via an oxygen atom, such as, for example, methoxy, ethoxy, n-propoxy, 1-methylethoxy (isopropoxy), n-butoxy, 1-methylpropoxy (sec-butoxy), 2-methylpropoxy (isobutoxy) or 1,1-dimethylethoxy (tert-butoxy), which is bonded in the form of an ether bond via the oxygen to a $C_1$-$C_4$ alkyl group as defined above. Examples are methoxymethyl, 2-methoxyethyl, ethoxymethyl, 3-methoxypropyl, and 3-ethoxypropyl.

"$C_5$-$C_6$ Cycloalkyl" stands for a cyclic alkyl radical having 5 to 6 carbon atoms. Examples are cyclopentyl and cyclohexyl.

"Phenyl-$C_1$-$C_4$ alkyl" stands for a phenyl group which is bonded to a $C_1$-$C_4$ alkyl group as defined above. Examples are benzyl, phenylethyl, phenylpropyl, and phenylbutyl.

"$C_1$-$C_4$ Alkanediyl" stands for an alkanediyl having 1 to carbon atoms. Examples are methanediyl, 1,1-ethanediyl, 1,2-ethanediyl, 1-methyl-1,1-ethanediyl, 1-methyl-1,2-ethanediyl, 1,3-propanediyl, 1,4-butanediyl, 1,1-dimethyl-1,2-ethanediyl, and 1,2-dimethyl-1,2-ethanediyl.

"$C_1$-$C_8$ Alkoxy" stands for an alkoxy group which has 1 to carbon atoms and is bonded via an oxygen atom. Examples are methoxy, ethoxy, n-propoxy, 1-methylethoxy (isopropoxy), n-butoxy, 1-methylpropoxy (sec-butoxy), 2-methylpropoxy (isobutoxy), 1,1-dimethylethoxy (tert-butoxy), n-pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, 2-ethylpropoxy, n-hexoxy, 1-methylpentoxy, 2-methylpentoxy, 3-methylpentoxy, 4-methylpentoxy, 1-ethylbutoxy, 2-ethylbutoxy, 3-ethylbutoxy, 1,2-dimethylbutoxy, 1,3-dimethylbutoxy, 2,3-dimethylbutoxy, 1-ethyl-2-methylpropoxy, and 1-isopropylpropoxy.

"$C_1$-$C_4$ Alkylcarbonyl", stands for a $C_1$-$C_4$ alkyl radical as defined above that is bonded via a carbonyl group—for example, for acetyl, propionyl, butyryl, pivaloyl, etc.

With regard to preferred embodiments of the invention, the radicals or groups $R^1$, $R^2$, $R^3$, $R^4$, $R^5$, $R^6$, $R^7$, $R^8$, A, X, Z, and Y in the compounds of the formula I and in the groups of the formula I' preferably have, independently of one another, one or more, or all, of the following definitions:
$R^1$ stands for hydrogen or $C_1$-$C_6$ alkyl, more particularly for hydrogen or $C_1$-$C_4$ alkyl, and especially for methyl or ethyl;
$R^2$ stands for hydrogen or $C_1$-$C_6$ alkyl, more particularly for $C_1$-$C_4$ alkyl, and especially for methyl or ethyl;
$R^3$ stands for hydrogen;
A stands for $C_1$-$C_4$ alkanediyl, more particularly for methanediyl, 1,2-ethanediyl, or 1,3-propanediyl, more preferably 1,2-ethanediyl;
X stands for O;
Z stands for C=O;
Y stands for a chemical bond;
$R^4$ stands for hydrogen or $C_1$-$C_4$ alkyl, more particularly for hydrogen or methyl;
$R^5$ stands for hydrogen;
$R^6$ stands for hydrogen;
$R^7$ where present stands for $C_1$-$C_4$ alkyl;
$R^8$ where present stands for $C_1$-$C_4$ alkyl.

The compounds of the formula I are prepared in general by the process elucidated in more detail hereinafter, in which a compound of the general formula II is reacted with a compound of the general formula III:

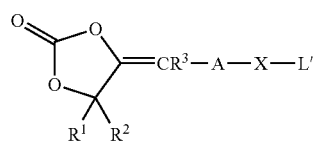

(II)

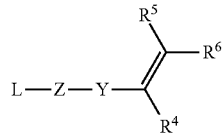

(III)

In formula II, L' stands for hydrogen or a hydroxyl-protecting or amino-protecting group, such as a $C_1$-$C_4$ alkylcarbonyl group, for example. The variables A, X, $R^1$, $R^2$, and $R^3$ have the definitions stated above, more particularly those definitions stated as being preferred.

In formula III, L is a nucleophilically displaceable leaving group, examples being halogen, OH or $C_1$-$C_8$ alkoxy. The variables Y, Z, $R^4$, $R^5$, and $R^6$ have the definitions stated above, more particularly the definitions stated as being preferred.

The reaction of the compounds of the formulae II and III can be carried out in analogy to known processes of nucleophilic substitution. Where L' is a hydroxyl-protecting or amino-protecting group, this protecting group is generally removed prior to the reaction of compound II with compound III, or reaction conditions are selected under which the protecting group is eliminated, so that the actual reactant is the compound of the formula II in which L' stands for hydrogen.

In accordance with one preferred embodiment of the invention, in formula III, the variable Z stands for C=O and the variable L stands for OH or $C_1$-$C_8$ alkoxy. In this case, the reaction of compound III with compound II, optionally following the removal of the hydroxyl-protecting or amino-protecting group, is accomplished as an amidation or esterification or transesterification reaction.

Especially suitable is the esterification or transesterification for the preparation of compounds of the formula I in which Z is C=O and X is O, A is $C_1$-$C_4$ alkanediyl, $R^4$ is hydrogen or $C_1$-$C_4$ alkyl, especially hydrogen or methyl, and $R^5$ and $R^6$ are hydrogen. In this case, preferred reactants of the formula III are selected from the $C_1$-$C_8$ alkyl esters of acrylic acid and of methacrylic acid, hereinafter (meth)acrylic acid $C_1$-$C_8$ alkyl esters, examples being methyl, ethyl, n-butyl and 2-ethylhexyl (meth)acrylates, and very preferably (meth)acrylic acid $C_1$-$C_4$ alkyl esters, examples being methyl, ethyl, and n-butyl (meth)acrylates.

According to one particularly preferred embodiment of the invention, in formula III, the variable L stands for OH or $C_1$-$C_8$ alkoxy, the variable Z stands for C=O, and, in formula II, the variable X stands for O, and the reaction of compound II with compound III is carried out under the conditions of an esterification or transesterification. In one specific configuration of this embodiment, L' in formula II stands for hydrogen or a $C_1$-$C_4$ alkylcarbonyl group, especially an acetyl group.

In one preferred embodiment the compounds of the formula I are prepared by esterification or transesterification with enzyme catalysis.

The enzyme-catalyzed esterification or transesterification may be carried out in analogy to the methods described in Biotechnol. Lett. 1990, 12, 825-830, Biotechnol. Lett. 1994, 16, 241-246, U.S. Pat. No. 5,240,835, WO 2004/05088, or DE 102009003035, hereby incorporated in full by reference.

Enzymes (E) which can be used for the enzyme-catalyzed esterification or transesterification are selected, for example, from hydrolases, esterases (E.C. 3.1.-.-), lipases (E.C. 3.1.1.3), glycosylases (E.C. 3.2.-.-), and proteases (E.C.

3.4.-.-), in free form or in a form immobilized physically or chemically on a support, preferably lipases, esterases, or proteases. Particularly preferred are Novozym® 435 from Novozymes (lipase from *Candida antarctica* B) or lipase from *Aspergillus* sp., *Aspergillus niger* sp., *Mucor* sp., *Penicillium cyclopium* sp., *Geotricum candidum* sp., *Rhizopus javanicus*, *Burkholderia* sp., *Candida* sp., *Pseudomonas* sp., or pig pancreas; especially preferred are lipases from *Candida antarctica* B or from *Burkholderia* sp.

The enzyme content of the reaction medium is generally in the range from about 0.1 to 10 wt %, based on the sum of the reactants of the formula II and III that are employed.

The compounds of the formula I may also be prepared by conventional esterification or transesterification under the reaction conditions, customary for these reactions, of an acid-catalyzed esterification or of an acid-catalyzed or base-catalyzed transesterification.

Particularly suitable acidic catalysts for an acid-catalyzed esterification are protic acids, such as sulfuric acid, sodium hydrogensulfate, hydrochloric acid, phosphoric acid, monosodium dihydrogenphosphate, disodium hydrogenphosphate, pyrophosphoric acid, phosphorous acid, hypophosphorous acid, methanesulfonic acid, trifluoromethanesulfonic acid, p-toluenesulfonic acid, and mixtures thereof. Also suitable are Lewis acids such as Ti compounds and Sn compounds, for example. Additionally suitable are acidic ion exchanger resins, examples being sulfonated or carboxylated ion exchanger resins, in each case in their acidic form.

Suitable basic catalysts for a transesterification are metal hydroxides and/or metal alkoxides, more particularly those of metals from groups 1, 2, and 13 of the Periodic Table, examples being alkali metal hydroxides such as NaOH or KOH, and also alkali metal and alkaline earth metal alkoxides, more particularly the corresponding methoxides or ethoxides such as sodium or potassium methoxide or sodium or potassium ethoxide. Additionally suitable are ion exchange resins.

The acidic or basic catalysts are used generally in a concentration of 0.0001 wt % to 20 wt %, preferably 0.001 wt % to 10 wt %, based on the overall reaction mixture.

The esterification or transesterification reaction of II with III may be configured for example as a batch process. In that case, generally, the compounds of the formulae II and III will be introduced into a reaction vessel and reacted with one another with addition of the catalyst and/or the enzyme. Alternatively the esterification or transesterification reaction can be configured as a semibatch process. For that purpose, one of the reactants, the compound II or compound III for example, and also the catalyst and/or the enzyme, can be introduced as an initial charge, and the other reactants can be supplied in the course of the reaction. Furthermore, the compound of the formula I can be prepared by continuous reaction of the compound II with the compound III. For this purpose, for example, the compounds II and III will be supplied continuously to a reaction zone containing the catalyst, and the compound of the formula I, optionally together with the co-products formed during the reaction, alcohol or ester, for example, will be removed continuously from the reaction zone. The catalyst and/or the enzyme will optionally likewise be supplied to the reaction zone. In the case both of semibatch and of continuous reaction, the reactants, i.e., the compounds of the formulae II and III, can be passed, preferably in liquid phase, through a reaction zone which contains the catalyst and/or the enzyme as a stationary phase.

The reaction time is dependent on factors including the temperature, the amount used and the activity of the acidic, basic, or enzymic catalyst, and the required conversion, and also on the structure of the compound II. The reaction time is adapted preferably such that the conversion of the compound II is at least 70%, preferably at least 80%, more preferably at least 90%, very preferably at least 95%, and more particularly at least 97%. For this purpose, generally, 1 to 48 hours are sufficient, preferably 1 to 12 hours, and more preferably 1 to 6 hours.

The enzyme-catalyzed or conventionally catalyzed esterification or transesterification takes place in general at temperatures in the range from 0 to 100° C., preferably 20 to 80° C., more preferably 20 to 70° C.

The molar ratio of compound II to compound III can be varied within a wide range. The compound III is preferably used in excess relative to the stoichiometry of the reaction. In general the molar ratio of compound II to compound III is in the range from 1:100 to 1:1, preferably 1:50 to 1:1, more preferably 1:20 to 1:1. The compound of the formula III is present preferably in excess, and so can be distilled off together with the liberated co-product, generally an alcohol or the ester co-product that is formed in the case of a transesterification (if X-L' in the formula II is alkylcarbonyloxy and Y-L in formula III is alkoxycarbonyl), under reduced pressure, in the form of an azeotrope, for example. Additionally or alternatively, the liberated water or the alcohol or the ester can be bound using molecular sieve, for example. In this way the reaction equilibrium is shifted in favor of the compound of the formula I.

The enzyme-catalyzed and also the conventionally catalyzed esterification or transesterification can be carried out in organic solvents or mixtures thereof or without addition of solvents. The reaction mixtures are generally largely anhydrous (i.e., water content below 10 vol %, preferably below 5 vol %, more preferably below 1 vol %).

The fraction of organic solvents in the reaction mixture may for example be 0.1 to 50 wt % and, if a solvent is used, is preferably in the range from 0.5 to 30 wt % or in the range from 1 to 10 wt %. It is preferred for no, or less than 1 wt % of, organic solvent to be added to the enzymically or conventionally catalyzed esterification or transesterification.

The compound I can be prepared in the presence of at least one polymerization inhibitor. Polymerization inhibitors that can be used include, for example, 4-methoxyphenol (MeHQ), hydroquinone, 2,5-di-tert-butylhydroquinone, 2,6-di-tert-butyl-p-cresol, nitroso compounds such as isoacryl nitrate, nitrosodiphenylamine, N-nitrosocyclohexylhydroxylamine, methylene blue, phenothiazine, or diphenylamine. Use of 4-methoxyphenol (MeHQ) as polymerization inhibitor is preferred.

The polymerization inhibitors are used generally, based on the amount of the compounds of the formula III, at from 1 to 10 000 ppm, preferably from 10 to 5000 ppm, more preferably from 30 to 2500 ppm, and more particularly from 50 to 1500 ppm.

The compounds of the formula III are known and are in general available commercially.

The compounds of the formula II can be prepared in analogy to known processes for preparing alkylidene-1,3-dioxolan-2-ones, as are described in the prior art cited at the outset, for example. Preferred compounds of the formula II, in which $R^3$ is hydrogen, can be prepared, for example by reaction of the compound of the formula IV with $CO_2$, preferably using a catalyst (see scheme 1):

Scheme 1. Preparation of compounds of the formula IIa.

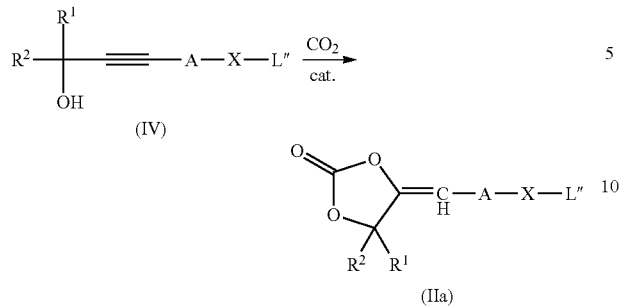

(IV)

(IIa)

In Scheme 1, $R^1$, $R^2$, A, and X have the definitions stated above. L" stands for an alcohol-protecting or amino-protecting group, and more particularly for $C_1$-$C_4$ alkylcarbonyl, especially for acetyl. X stands in particular for oxygen. A stands in particular for $C_1$-$C_4$ alkanediyl.

Suitable catalysts are in principle transition metal catalysts comprising as active metal, for example, silver, copper, gold, palladium or platinum, examples being silver salts such as silver acetate, silver carbonate, and copper(II) salts such as copper acetate, or copper(I) halides such as CuI, CuBr, and CuCl, and also palladium(0) catalysts, it being possible for the aforementioned transition metal compounds to be used optionally in combination with an organic amine, as for example a tri-$C_1$-$C_6$ alkylamine such as triethylamine or an amidine base such as 1,5-diazabicyclo[4.3.0]non-5-ene (DBN) or 1,8-diazabicyclo[5.4.0]undec-7-ene (DBU), or with an organic phosphine, examples being trialkylphosphines or triarylphosphines such as tributylphosphine and triphenylphosphine, or in combination with a mixture of one of these aforementioned phosphines with an ammonium salt, such as, for example, tri-$C_1$-$C_6$ alkylammonium halides or tetra-$C_1$-$C_6$ alkylammonium halides. Further catalysts contemplated include organic phosphines as such, such as trialkylphosphines or triarylphosphines such as tributylphosphine or triphenylphosphine, and also sterically hindered carbenes, such as 1,3-substituted 2,3-dihydroimidazol-2-ylidene compounds such as 1,3-diisopropyl-2,3-dihydro-4,5-imidazol-2-ylidene or $CO_2$ adducts thereof, and also combinations of these with the aforementioned phosphines. The reaction can be carried out unpressurized or, preferably, under elevated pressure, such as at 50 to 500 bar, for example, or in supercritical $CO_2$. For the reaction conditions, refer to the literature identified above.

In place of $CO_2$ it is also possible to use a carboxylic anhydride such as, for example, bis(tert-butyl)dicarbonic anhydride ($Boc_2O$). In this case the reaction takes place usually in two stages, where in the first stage the compound IV is reacted with an ester of the biscarbonic anhydride, such as with $Boc_2O$, for example, in the presence of a base, sodium hydride for example, and the resultant ester is cyclized in the presence of a transition metal catalyst, such as a gold-containing catalyst, for example. A procedure of this kind is described in Org. Lett. 2006, 8, 515-518, for example, hereby incorporated by reference.

Used with preference in the coating material compositions of the invention are compounds (B) in which in the formula (I') $R^1$ and $R^2$ are each hydrogen or $C_1$-$C_6$ alkyl, more particularly methyl, and/or $R^3$ is hydrogen. Likewise preferred is use of compounds (B) in which in the formula (I')

A is ethanediyl, X is O, Z is C=O, and Y is a chemical bond, and which are obtainable by using the corresponding monomers (B1).

The compound (B) is obtainable using at least 10 wt %, based on the total amount of the ethylenically unsaturated compounds that form the polymer, of at least one monomer (B1) of the formula I

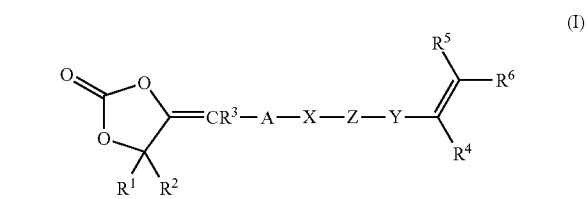

(I)

in which A, X, Y, Z, $R^1$, $R^2$, and $R^3$ have the definitions stated in the text above and
$R^4$ is hydrogen, $C_1$-$C_4$ alkyl, $CH_2COOR^8$, phenyl, or phenyl-$C_1$-$C_4$ alkyl;
$R^5$ and $R^6$ independently of one another are hydrogen or $C_1$-$C_4$ alkyl or else one of the radicals, $R^5$ or $R^6$, may be $COOR^8$ or $CH_2COOR^8$, and
$R^8$ where present is hydrogen or $C_1$-$C_6$ alkyl.

In one particularly preferred embodiment of the present invention the compound (B) is obtainable using from 10 to 80 wt %, preferably 25 to 70 wt %, and more preferably 35 to 65 wt % of at least one monomer (B1) of the formula (I) and 20 to 90 wt %, preferably 30 to 75 wt %, more particularly 35 to 65 wt % of at least two different comonomers (B2) and (B3) and optionally (B4), optionally (B5), optionally (B6) to optionally (Bn) which are each different from (B1), the wt % figures being based in each case on the total weight of all monomers (B1) used to prepare the compound (B) plus (B2) plus (B3) plus optionally (B4) to (B7) plus further comonomers (Bn) optionally used. The sum of the weight fractions of all monomers (B1) plus all comonomers (B2) to (Bn), accordingly, always makes 100 wt %.

The compound (B) is more preferably obtainable using from 2 to 6 monoethylenically unsaturated comonomers (B2) to (B7) that are different from one another.

Preferably, the comonomers (B2), (B3), (B4), (B5), (B6), (B7), and optionally further comonomers (Bn) are selected from the group of vinylaromatic compounds and esters of monoethylenically unsaturated aliphatic monocarboxylic acids with aliphatic alkanols, or esters of monoethylenically unsaturated aliphatic monocarboxylic acids with cycloaliphatic alkanols, or mixtures of at least two of these comonomers.

Particularly preferred are the comonomers (B2), (B3), (B4), (B5), (B6), (B7), and optionally further comonomers (Bn) selected from the group of esters of monoethylenically unsaturated aliphatic $C_3$-$C_6$-monocarboxylic acids with $C_1$-$C_8$ alkanols, or the esters of monoethylenically unsaturated aliphatic $C_3$-$C_6$ monocarboxylic acids with $C_5$-$C_8$ cycloalkanols, or vinylaromatic compounds, or mixtures of at least two of these comonomers.

Examples of esters of monoethylenically unsaturated aliphatic monocarboxylic acids with aliphatic alkanols that are suitable as comonomers (B2), (B3), (B4), (B5), (B6), (B7), and optionally further comonomers (Bn) are, in particular, the esters of acrylic acid and methacrylic acid such as methyl acrylate, ether acrylate, n-butyl acrylate, 2-butyl acrylate, isobutyl acrylate, tert-butyl acrylate, and 2-ethylhexyl acrylate, methyl methacrylate, ethyl methacrylate, n-butyl methacrylate, 2-butyl methacrylate, isobutyl methacrylate, tert-butyl methacrylate, 2-ethylhexyl methacrylate, 3,3,5-trimethylhexyl acrylate, 3,3,5-trimethylhexyl methacrylate, stearyl acrylate, stearyl methacrylate, lauryl acrylate, or lauryl methacrylate, and also the corresponding esters of crotonic acid and isocrotonic acid.

Examples of esters of monoethylenically unsaturated monocarboxylic acids with cycloaliphatic alkanols that are suitable as comonomers (B2), (B3), (B4), (B5), (B6), (B7), and optionally further comonomers (Bn) are esters of acrylic acid and methacrylic acid such as cyclopentyl acrylate, cyclohexyl acrylate, cyclopentyl methacrylate, cyclohexyl methacrylate, isobornyl acrylate, isobornyl methacrylate, and also the corresponding esters of crotonic acid and isocrotonic acid.

Examples of vinylaromatic hydrocarbons suitable as comonomers are styrene, α-methylstyrene, and the vinyltoluene isomers.

As comonomer (B2), (B3), (B4), (B5), (B6), (B7), and optionally further comonomers (Bn) it is possible in this case to make use of
  mixtures of at least two, preferably 2 to 6, different esters of monoethylenically unsaturated aliphatic monocarboxylic acids with aliphatic alkanols, or
  mixtures of at least two, preferably 2 to 6, different esters of monoethylenically unsaturated aliphatic monocarboxylic acids with cycloaliphatic alkanols, or
  mixtures of at least two, preferably 2 to 6, different vinylaromatic hydrocarbons.

Particular preference is given to using as comonomers (B2), (B3), (B4), (B5), (B6), (B7), and optionally further comonomers (Bn)
  mixtures of at least two, preferably 2 to 6, different comonomers of at least one ester of monoethylenically unsaturated $C_3$-$C_6$ monocarboxylic acids with $C_1$-$C_8$ alkanols with at least one vinylaromatic hydrocarbon, or
  mixtures of at least two, preferably 2 to 6, different comonomers of at least one ester of monoethylenically unsaturated $C_3$-$C_6$ monocarboxylic acids with $C_1$-$C_8$ alkanols with at least one ester of monoethylenically unsaturated $C_3$-$C_6$ monocarboxylic acids with $C_5$-$C_8$ cycloalkanols, or
  mixtures of at least two, preferably 2 to 6, different comonomers of at least one ester of monoethylenically unsaturated $C_3$-$C_6$ monocarboxylic acids with $C_5$-$C_8$ cycloalkanols with at least one vinylaromatic hydrocarbon, or
  mixtures of 3 to 6 different comonomers of at least one ester of monoethylenically unsaturated $C_3$-$C_6$ monocarboxylic acids with $C_1$-$C_8$ alkanols with at least one ester of monoethylenically unsaturated $C_3$-$C_6$ monocarboxylic acids with $C_5$-$C_8$ cycloalkanols and with at least one vinylaromatic hydrocarbon.

Especially preferred is the use of a mixture of a vinylaromatic hydrocarbon and 2 to 4 different alkyl esters of $C_1$-$C_8$ alkanols with acrylic acid and/or with methacrylic acid.

The compounds (B) used in accordance with the invention generally have a number-average molecular weight in the range from 300 to 100 000 daltons, more particularly in the range from 500 to 15 000 daltons, more preferably from 900 to 10 000 daltons, and weight-average molecular weights of between 500 and 200 000 daltons, preferably 500 to 20 000 daltons, and more preferably between 1000 and 15 000 daltons, in each case measured by means of gel permeation chromatography (GPC) against a polystyrene standard.

The polymerization of the monomers can be carried out according to customary methods of radical polymerization. These include solution and precipitation polymerization, suspension polymerization, and emulsion polymerization, including a miniemulsion polymerization. The polymerization takes place more particularly by solution polymerization.

Suitable solvents or diluents are more particularly those in which the monomers to be polymerized are soluble. Suitable solvents encompass, in particular, aprotic solvents. These include aliphatic and cycloaliphatic hydrocarbons and halogenated hydrocarbons, aromatic hydrocarbons and aromatic halogenated hydrocarbons, alkyl esters and cycloalkyl esters of aliphatic monocarboxylic acids, N,N-dialkyl amides of aliphatic carboxylic acids, alicyclic and cyclic ketones, ethers, and mixtures of the aforementioned aprotic solvents.

In general the amount of organic solvent will be calculated such that the amount of the monomers to be polymerized, based on the total amount of monomers plus solvent, is in the range from 10 to 65 wt %, more particularly in the range from 20 to 60 wt %. In the case of a solution polymerization, accordingly, polymer solutions with solids contents in the range from 10 to 90 wt % and more particularly 20 to 80 wt % are obtained.

The polymerization of the monomers may take place in accordance with customary methods of radical homo- or copolymerization. For these purposes, generally speaking, the monomers will be polymerized under reaction conditions in which radicals are formed.

Radical formation is generally accomplished through use of what is called a polymerization initiator—that is, a compound which forms radicals on decomposition, which can be triggered chemically, thermally, or photochemically.

The suitable polymerization initiators include organic azo compounds, organic peroxides and hydroperoxides, inorganic peroxides, and what are called redox initiators.

Established practice in particular is to include a small portion of the monomers, such as 0.1 to 20 wt %, for example, based on the total amount of the monomers to be polymerized, optionally together with a portion or the entirety of polymerization initiator and with a portion or the entirety of the solvent or diluent, in the initial charge to the polymerization vessel, to commence the polymerization, by heating of the polymerization mixture, for example, and then to add the remainder of the monomers and, where necessary, the remainder of the polymerization initiator and solvent in the course of the polymerization.

The polymerization temperatures typically employed are generally, depending on the initiator system selected, in the range from 20 to 200° C., more particularly in the range from 40 to 180° C., and especially in the range from 80 to 160° C.

The polymerization pressure is of minor importance and may be situated in the region of atmospheric pressure or slight subatmospheric pressure, e.g., >800 mbar, or at superatmospheric pressure, e.g., at up to 10 bar, and higher or lower pressures may likewise be employed. The polymerization time will generally not exceed 10 hours and is frequently situated in the range from 1 to 8 hours.

Preference in accordance with the invention is given to using coating material compositions which comprise from 97 to 70 wt %, more preferably from 95 to 75 wt %, of the polycarbonate component (B), the wt % figures being based in each case on the binder fraction of the coating material [that is, based on the total weight of the binder fraction of the compounds (B) of the invention plus the binder fraction of the polyamine (A) plus weight of the catalyst (D) optionally used].

Catalyst (D)

The coating material compositions of the invention may optionally comprise at least one catalyst (D) for the crosslinking. The catalysts are used, if desired, in fractions from 0.01 wt % to about 10 wt %, more particularly 0.1 to 5 wt %, based on the binder fraction of the coating material [that is, based on the total weight of the binder fraction of the compounds (B) of the invention plus the binder fraction of the polyamine (A) plus weight of the catalyst (D) optionally used].

Examples of suitable catalysts are more particularly cyclic and bicyclic amines different from component (A), such as, for example, 1,4-diazabicyclo[2.2.2]-octane, 4-(dimethylamino)pyridine, 1,5-diazabicyclo-[4.3.0]non-5-ene, 1,8-diazabicyclo[5.4.0]undec-7-ene, and 1,5,7-triazabicyclo-[4.4.0]dec-5-ene. Further suitable as catalyst (D) are also amidines of the formula (DI) and derivatives thereof, more particularly based on a zinc-amidine complex which is preparable by reacting one or more zinc(II) biscarboxylates with an amidine of the formula (DI) or with a mixture of two or more amidines of the formula (DI)

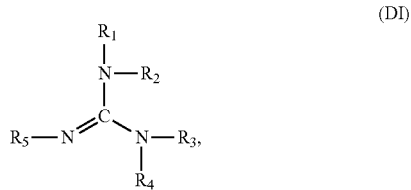

(DI)

where $R_5$=hydrogen and $R_1$, $R_2$, $R_3$, and $R_4$ are each identical or different radicals, with $R_1$ and $R_3$ being hydrogen or an alkyl radical or an aryl radical, and $R_2$ and $R_4$ being an alkyl radical or an aryl radical.

Amidines of these kinds and also derivatives thereof are described in WO 2012/123166, WO 2012/123161 and WO 2012/123198, for example. Furthermore, the imidazoles and derivatives thereof that are identified in WO 2012/126796 and in WO 2013/110712 are also suitable as catalysts.

The Combination of Components (A), (B), Optionally (D), and Also Further Components of the Coating Material Compositions The two-component (2K) coating material compositions that are particularly preferred in accordance with the invention are formed by the mixing, in a conventional way shortly before the coating material is applied, of a paint component comprising the polyamino group-containing compound (A) and also further components, described below, with a further paint component comprising the carbonate group-containing compound (B) and also, optionally, further of the components described below, with the paint component comprising the compound (A) generally comprising the catalyst (D) and also a part of the solvent.

The polyamino group-containing component (A) may be present in a suitable solvent. Suitable solvents are those which permit sufficient solubility of the polyamino group-containing component.

The weight fractions of the polyamine (A) and of the compounds (B) are preferably selected such that the molar equivalents ratio of the amino groups of the polyamino group-containing compound (A) to the carbonate groups (I') of component (B) is between 1:0.5 and 1:1.5, preferably between 1:0.8 and 1:1.2, more preferably between 1:0.85 and 1:1.15.

The polyamino group-containing component (A) and/or the polycarbonate component (B) may be present in a suitable solvent.

Solvents (L) especially suitable for the coating materials of the invention are those which in the coating material are chemically inert toward the compounds (A) and optionally (B) and which also do not react with (A) and (B) during the curing of the coating material. Examples of such solvents are aliphatic and/or aromatic hydrocarbons such as toluene, xylene, Solventnaphta®, Solvesso 100 or Hydrosol® (from ARAL), alcohols, esters, such as ethyl acetate, butyl acetate, pentyl acetate, or ethyl ethoxypropionate, ethers or mixtures of the aforementioned solvents. The aprotic solvents or solvent mixtures preferably have a water content of not more than 1 wt %, more preferably not more than 0.5 wt %, based on the solvent.

In the coating material compositions of the invention, the solvent or solvents are used preferably in an amount such that the binder content of the coating material composition is at least 50 wt %, more preferably at least 60 wt %. It should be borne in mind here that in general, with higher solids content, the viscosity of the coating material composition goes up, and the leveling of the coating material composition and hence the overall visual impression given by the cured coating become poorer.

The binder mixture of the invention or the coating material composition of the invention may further comprise at least one customary and known coatings additive (F), different from components (A), (B) and (D), in effective amounts, i.e., in amounts preferably up to 30 wt %, more preferably up to 20 wt %, and more particularly up to 10 wt %, based in each case on the binder fraction of the coating material composition.

Examples of suitable coatings additives (F) are as follows:
especially UV absorbers;
especially light stabilizers such as HALS compounds, benzotriazoles, or oxalanilides;
radical scavengers;
slip additives;
polymerization inhibitors;
defoamers;
reactive diluents different from component (A), more particularly reactive diluents which become reactive only on reaction with further constituents and/or water, such as Incozol or aspartic esters, for example;
wetting agents different from component (A), such as siloxanes, fluorine compounds, carboxylic monoesters, phosphoric esters, polyacrylic acids and copolymers thereof, or polyurethanes;
adhesion promoters;
flow control agents;
rheological assistants, based for example on customary hydrophilic and/or hydrophobic fumed silica, such as various Aerosil® grades, or customary urea-based rheological assistants;
film-forming auxiliaries such as cellulose derivatives;
fillers such as, for example, nanoparticles based on silicon dioxide, aluminum oxide, or zirconium oxide; for further details, refer to Römpp Lexikon "Lacke and Druckfarben", Georg Thieme Verlag, Stuttgart, 1998, pages 250 to 252;
flame retardants.

Particularly preferred are coating material compositions which comprise
5 to 25 wt %, based on the binder fraction of the coating material composition, of at least one polyamino group-containing compound (A),
95 to 75 wt %, based on the binder fraction of the coating material composition, of the polycarbonate group-containing compound (B),
0 to 10 wt %, based on the binder fraction of the coating material composition of the invention, of at least one catalyst (D),
0 to 20 wt %, based on the binder fraction of the coating material composition, of at least one customary and known coatings additive (F).

The binder fraction of the coating material composition is determined prior to crosslinking by weighing out a small sample (P) of the coating material composition and subsequently determining the solids by drying it at 130° C. for 60 minutes, cooling it, and then reweighing it. The residue corresponds to the binder fraction of the sample (P). The binder fraction of the coating material composition, in wt %, is then given, correspondingly, by 100 multiplied by the quotient formed from the weight of the residue of the sample (P) after drying at 130° C., divided by the weight of the sample (P) prior to drying.

The binder fraction of the individual components (A) or (B) of the coating material is determined analogously by weighing out a small sample (P) of the respective component (A) or (B) and subsequently determining the solids by drying it at 130° C. for 60 minutes, cooling it, and then reweighing it. The binder fraction of the component in wt % is then given, correspondingly, by 100 multiplied by the quotient formed from the weight of the residue of the respective sample (P) after drying at 130° C., divided by the weight of the respective sample (P) prior to drying.

If polyamines are used as component (A) that are liquid under atmospheric pressure of 1013 mbar and at 25° C., then the binder fraction for component (A) is based on the weighed-out weight of the polyamine (A) without solvent or, in the case of solutions, on the weight of the polyamine (A) determined arithmetically from the concentration specified for the solution.

In a further embodiment of the invention, the binder mixture of the invention or the coating material composition of the invention may further comprise additional pigments and/or fillers and may serve for the production of pigmented topcoats or pigmented undercoats or primer-surfacers more particularly pigmented topcoats. The pigments and/or fillers employed for these purposes are known to the skilled person. The pigments are typically used in amounts such that the pigment-to-binder ratio is between 0.05:1 and 1.5:1, based in each case on the binder fraction of the coating material composition.

Since the coatings of the invention produced from the coating materials of the invention adhere outstandingly even to already-cured electrocoats, primer-surfacer coats, basecoats or customary and known clearcoats, they are outstandingly suitable, in addition to their use in automotive OEM (production-line) finishing, for automotive refinishing and/or for the coating of parts for installation in or on motor vehicles, and/or for the coating of commercial vehicles.

The application of the coating material compositions of the invention may take place by any of the customary application methods, such as, for example, spraying, knife-coating, spreading, pouring, dipping, impregnating, trickling or rolling. With respect to such application, the substrate to be coated may itself be at rest, with the application unit or equipment being moved. Alternatively, the substrate to be coated, more particularly a coil, may be moved, with the application unit being at rest relative to the substrate or being moved appropriately.

Preference is given to employing spray application methods, such as, for example, compressed air spraying, airless spraying, high speed rotation, electrostatic spray application (ESTA), alone or in conjunction with hot spray application such as hot air spraying, for example.

The curing of the applied coating materials of the invention may take place after a certain rest time. The rest time serves, for example, for the leveling and degassing of the coating films or for the evaporation of volatile constituents such as solvents. The rest time may be assisted and/or shortened through the application of elevated temperatures and/or through a reduced atmospheric humidity, provided that this does not entail any instances of damage to or change in the coating films, such as a premature complete crosslinking.

The thermal curing of the coating materials has no peculiarities in terms of method, but instead takes place in accordance with the customary and known methods, such as heating in a forced air oven or irradiation with IR lamps. This thermal curing may also take place in stages. Another preferred curing method is that of curing with near infrared (NIR radiation).

The thermal curing takes place advantageously at a temperature of 20 to 200° C., preferably 40 to 190° C. and more particularly 50 to 180° C., for a time of 1 min up to 10 h, preferably 2 min to 5 h and more particularly 3 min to 3 h, with longer cure times also being employable at low temperatures. For automotive refinishing and for the coating of plastics parts, and also for the coating of commercial vehicles, relatively low temperatures are typically employed here, of preferably between 20 and 80° C., more particularly between 20 and 60° C.

The coating materials of the invention are outstandingly suitable as decorative, protective and/or effect coatings and finishes on bodywork of means of transport (especially motor vehicles, such as cycles, motorcycles, buses, lorries or cars) or of parts thereof; on the interior and exterior of edifices; on furniture, windows and doors; on plastics moldings, especially CDs and windows; on small industrial parts, on coils, containers and packaging; on white goods; on films; on optical, electrical and mechanical components; and also on hollow glassware and articles of everyday use.

The coating material compositions of the invention can therefore be applied, for example, to an uncoated or pre-coated substrate, the coating materials of the invention being either pigmented or unpigmented. The coating material compositions and paint systems of the invention in particular, more particularly the clearcoats, are employed in the technologically and esthetically particularly demanding field of automotive OEM finishing and for the coating of plastics parts for installation in or on car bodies, more particularly for top-class car bodies, such as, for example, for producing roofs, hatches, bonnets, fenders, bumpers, spoilers, sills, protective strips, side trim and the like, and for the finishing of commercial vehicles, such as, for example, of lorries, chain-driven construction vehicles, such as crane vehicles, wheel loaders and concrete mixers, buses, rail vehicles, watercraft, aircraft, and also agricultural equipment such as tractors and combines, and parts thereof, and also for automotive refinishing, with automotive refinishing encompassing not only the repair of the OEM finish on the line but also the repair of local defects, such as scratches, stone chip damage and the like, for example, and also complete recoating in corresponding repair workshops and car paint shops for the value enhancement of vehicles.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably used with a polycarbonate fraction >40%, more particularly >50%.

ASA refers generally to impact-modified styrene/acrylonitrile polymers, in which graft copolymers of vinylaromatic compounds, more particularly styrene and of vinyl cyanides, more particularly acrylonitrile, are present on polyalkyl acrylate rubbers in a copolymer matrix of, in particular, styrene and acrylonitrile.

With particular preference, the coating material compositions of the invention are used in multistage coating processes, more particularly in processes in which an optionally precoated substrate is coated first with a pigmented basecoat film and then with a film with the coating material composition of the invention. The invention accordingly also provides multicoat color and/or effect finishes comprising at least one pigmented basecoat and at least one clearcoat applied thereon, these finishes being characterized in that the clearcoat has been produced from the coating material composition of the invention.

Not only water-thinnable basecoats but also basecoats based on organic solvents can be used. Suitable basecoats are described in, for example, EP-A-0 692 007 and in the documents listed therein at column 3 lines et seq. Preferably, the applied basecoat is first dried—that is, in an evaporation phase, at least some of the organic solvent and/or of the water is removed from the basecoat film. Drying takes place preferably at temperatures from room temperature to 80° C. After drying has taken place, the coating material composition of the invention is applied. The two-coat finish is subsequently baked, preferably under conditions employed in automotive OEM finishing, at temperatures from 20 to 200° C. for a time of 1 min up to 10 h; in the case of the temperatures employed for automotive refinishing, which in general are between 20 and 80° C., more particularly between 20 and 60° C., longer cure times may also be employed.

In another preferred embodiment of the invention, the coating material composition of the invention is used as a transparent clearcoat for the coating of plastics substrates, particularly of plastics parts for interior or exterior installation. These plastics parts for interior or exterior installation are preferably coated likewise in a multistage coating process, in which an optionally precoated substrate or a substrate which has been pretreated for enhanced adhesion of the subsequent coatings (by means, for example, of flaming, corona treatment or plasma treatment of the substrate) is coated first with a pigmented basecoat film and thereafter with a film with the coating material composition of the invention.

EXAMPLES

Preparation of 5-methyl-hex-3-yne-1,5-diol

Synthesis took place as per Bull. Acad. Sci. USSR 1965, 683.

In an 8 L reactor with 3-stage 2-blade offset shearing-blade stirrer and thermostat, at 20° C. under an $N_2$ atmosphere, 100.0 g (1.384 mol) of 3-butyn-1-ole (purity 97.0%, Acros) were dissolved in 3.92 L of toluene (purity 99.9%, BASF SE) and with stirring 320.0 g (4.848 mol) of KOH (purity 85.0%, BASF SE) were added. Over the course of 20 minutes a mixture of 441.0 mL (6.00 mol) of acetone and 320.9 mL of toluene was added. Added slowly to the reaction mixture were 3 L of fully demineralized water, in order to dissolve the solid fully. The phases were separated and the aqueous phase was extracted with twice 2 L of ethyl acetate. The solvent was removed from the combined organic phases under reduced pressure (50° C., about 5 mbar). This gave 183.5 g of the product.

The identity of the product of the title compound was verified by gas chromatography (GC method: ESMA6F, 30 m RTX-5-amine 1 μm. 32 mm/80-0-R: 15° C./min-250).

Preparation of 5-hydroxy-5-methyl-hex-3-ynyl acetate 100 g (0.78 mol) of 5-methyl-hex-3-yne-1,5-diol were dissolved in 800 mL of dichloromethane and cooled to 0° C. 113 mL (1.11 mol) of acetic anhydride were added in one portion. 127 mL (1.25 mol) of triethylamine were cooled to 0-2° C. and added over the course of 20 minutes. The reaction mixture was stirred at 0° C. for 2 hours. The cooling was removed and the reaction batch was stirred at 20° C. for 16 hours. The mixture was cooled to 0° C. and 1200 mL of 5% strength hydrochloric acid were added, the temperature of the reaction mixture being held below 5° C. The batch was extracted with three times 150 mL of tert-butyl methyl ether (MTBE) and the combined organic phases were stirred four times for about 1 hour in each case with 400 mL each time of 5% strength aqueous sodium hydrogen carbonate solution, in each case until gas evolution was no longer observed. The organic phase was washed with 1 L of fully demineralized water, and dried over sodium sulfate, and the solvent was removed. This gave 122.21 g (yield 92%) of a clear, dark yellow liquid. The purity was determined by gas chromatography to be 99.5%.

$1^H$ NMR (CDCl$_3$, 500 MHz): 1.5 (s, 6H, C(CH$_3$)$_2$), 2.1 (s, 3H, C(O)CH$_3$), 2.5 (t, 2H, CH$_2$CH$_2$O), 3.4 (bs, 1H, OH), 4.1 (t, 2H, CH$_2$CH$_2$O) ppm.

Preparation of 4,4-dimethyl-5-(3-acetoxypropylidene)-1,3-dioxolan-2-one (exo-VC-OAc)

A 300 mL autoclave was charged with 50 g of 5-hydroxy-5-methyl-hex-3-ynyl acetate in 74 mL of toluene. Added to this initial charge was 0.9 g of silver acetate and 7.8 g of 1,8-diazabicyclo[5.4.0]undec-7-ene (DBU). The reaction batch was heated to 70° C. and a CO$_2$ pressure of 50 bar was established. After 40 hours, the autoclave was let down to atmospheric pressure and the reaction batch was washed with twice 100 mL of water and with 100 mL of 5% strength hydrochloric acid. The combined aqueous phases were extracted with 100 mL of toluene and the combined organic phases were dried over sodium carbonate. The solvent was removed and the residue obtained was recrystallized from 200 g of cyclohexane. This gave 35 g of the product of the title compound (purity >99%). The identity of the title compound was verified by gas chromatography (GC method: 30 m FFAP ID=0.32 mm, FD=0.25 μm; 80° C. 6K/min to 250° C. temp. holding; retention time: 20.6 minutes).

$^1$H NMR (CDCl$_3$, 500 MHz): 1.5 (s, 6H, C(C$\underline{H}_3$)2), 2.1 (s, 3H, C(O)C$\underline{H}_3$), 2.5 (t, 2H, C$\underline{H}_2$CH$_2$O), 3.4 (bs, 1H, O$\underline{H}$), 4.1 (t, 2H, C$\underline{H}_2$CH$_2$O) ppm.

Preparation of [(3Z)-3-(5,5-dimethyl-2-oxo-1,3-dioxolan-4-ylidene)propyl] acrylate (exo-VCA)

280 g (1.31 mol) of [(3Z)-3-(5,5-dimethyl-2-oxo-1,3-dioxolan-4-ylidene)propyl] acetate (exo-VC-OAc), 1307 g (13.1 mol) of ethyl acrylate, 0.28 g of 4-methoxyphenol (MeHQ), and 84 g (30 wt %) of Novozym® 435 from Novozymes were combined. The batch was stirred at 40° C. for 24 hours. The batch was filtered, the filter product was washed with acetone, and the solvent was removed on a rotary evaporator at 40° C. This gave 276.7 g of the product of the title compound, with a purity of 92.4% (GC analysis).

$^1H$ NMR (CDCl$_3$, 400 MHz): 1.6 (s, 6H), 2.5 (q, 2H), 4.2 (t, 2H), 4.7 (t, 1H), 5.84-5.87 (dd, 1H), 6.09-6.16 (dd, 1H), 6.37-6.42 (dd, 1H) ppm.

Examples 1 to 3 and Comparative Examples C1 to C5

Preparation of a copolymer with exo-VCA-monomer (B-E)

A glass flask heated by oil bath and equipped with stirrer, thermometer, and two feed vessels was charged with 100 g of butyl acetate 98/100. For the monomer mixture, 20 g of n-butyl acrylate, 20 g of n-butyl methacrylate, 30 g of methyl methacrylate, 50 g of styrene, and 80 g of exo-VCA were charged to one of the feed vessels. (Final solids content: 50%). The mixture was heated to 125° C. under a stream of nitrogen and with stirring. In a further feed vessel, a solution of 12 g of TBPEH (=tertiary-butyl per-2-ethyl-hexanoate, from Pergan, Bocholt, or United Initiators, Pullach) is introduced. When 125° C. have been reached, the initial initiator feed is commenced at a rate such that the total feed time is 220 minutes. 10 minutes after the initial initiator feed, the monomer mixture is commenced, with a total feed time of 180 minutes. (=Subsequent initiator feed of 30 minutes). After the end of all the feeds, the reaction mixture is held at this temperature for a further 180 minutes, and then cooled.

The viscosity of the resulting mixture (measured by means of a Brookfield CAP 2000 rotary viscometer, spindle 3, 1000 rpm) is found to be 39 mPa*s; the solids (1 h 130° C.) is 44%±1%; the acid number is 1.4 mg KOH/g resin solids, and the equivalent weight is 555 g. The number-average molecular weight is 3025 daltons, and the weight-average molecular weight is 8315 daltons, each determined by means of gel permeation chromatography using the Agilent 1100 Series instrument at 35° C., with a high-performance liquid chromatography pump and with the refractive index detector Agilent RIGI 1362A+UV G 1314A, against a polystyrene standard.

Preparation of a Copolymer with Glycerol Carbonate Acrylate (B-V)

Corresponding to the example for polymer B of WO2012/130718, page 18, a copolymer was prepared using glycerol carbonate acrylate, as follows:
initial charge: 150.630 g of 1-methoxy-2-propanol
feed 1: 98.440 g of glycerol carbonate acrylate, 84.380 g of 2-ethylhexyl acrylate, 98.440 g of styrene feed 2: 11.250 g of tert-butyl peroctoate, 141.600 g of 1-methoxy-2-propanol
feed 3: 1.410 g of tert-butyl peroctoate, 17.750 g of 1-methoxy-2-propanol
Procedure A 1 L polymerization vessel was charged with 150.63 g of 1-methoxy-2-propanol and this initial charge was heated to 120° C. under a nitrogen atmosphere and with stirring. At 120° C., feed 1 and feed 2 were commenced and were metered in over 2 hours. This was followed by the metered introduction of feed 3, over the course of 0.25 hours. After the end of the addition, the resulting reaction mixture was stirred at 120° C. for a further 120 minutes. In this way a polymer solution was obtained. The polymer solution thus prepared was clear and colorless. It had a solids content of 47.6% and a viscosity of 324 mPas (Brookfield, spindle 3/50 rpm, 20° C.). The K value, determined according to Fikentscher, was 15.6 (1% strength in methoxypropanol, in accordance with DIN EN ISO 1628-1). The glass transition point was determined by DSC in accordance with DIN 51005, and was 38° C.

Table 1 compiles the comonomers used for preparing the copolymer of the invention (B-E) and the comparative copolymer (B-V), and also the characteristics and compositions of the inventive copolymer (B-E) and of the comparative copolymer (B-V).

TABLE 1

Characteristics and compositions of the inventive copolymer (B-E) and of the comparative copolymer (B-V)

|  | Exo-VC copolymer (B-E) | Glycerol carbonate copolymer (B-V) |
|---|---|---|
| Styrene | 25 | 35 |
| n-Butyl methacrylate | 10 | — |
| n-Butyl acrylate | 10 | — |
| Glycerol carbonate acrylate (B1-V) | — | 35 |
| Ethylhexyl acrylate | — | 30 |
| Methyl methacrylate | 15 | — |
| Exo-VC (B1-E) | 40 | — |
| TBPEH [1] | 6 | — |
| tert-Butyl peroctoate | — | 4 |
| Methoxypropanol | — | 100 |
| Butyl acetate | 100 | — |
| SC in % | 44.2% (1 h 130° C.) | 47.2 (2 h 100° C.) |
| Mn [2] | 3025 | 5320 |
| Mw [3] | 8315 | 15000 |

Key to table 1:
[1] TBPEH = tert-butyl 2-ethylperoxyhexanoate
[2] Mn = number-average molecular weight, determined by gel permeation chromatography with the Agilent 1100 Series instrument at 35° C., using a high-performance liquid chromatography pump and the Agilent RIGI 1362A + UV G 1314A refractive index detector, against a polystyrene standard
[3] Mw = weight-average molecular weight, determined by gel permeation chromatography with the Agilent 1100 Series instrument at 35° C., using a high-performance liquid chromatography pump and the Agilent RIGI 1362A + UV G 1314A refractive index detector, against a polystyrene standard

Clearcoat Compositions

With the copolymers B-E and B-V, butyl acetate and additives identified in table 2, and in accordance with the weighed amounts below, the respective first component of a two-component clearcoat was prepared. To produce two-component clearcoat coatings, the first components, each prepared in accordance with the above information, are homogenized with the second component, the ether group-containing polyamine (A1) or the amine mixture (A2), the weighed amounts of which are identified in table 2, and immediately thereafter are applied.

TABLE 2

Composition of the clearcoat compositions in parts by weight

|  | Comp. ex. 1 | Comp. ex. 2 | Inv. ex. 1 | Inv. ex. 2 | Inv. ex. 3 |
|---|---|---|---|---|---|
| Carbonate acrylate copolymer (B-V) | 100.00 | 100.00 |  |  |  |
| Exo VC-acrylate copolymer (B-E) |  |  | 107.00 | 107.00 | 107.00 |
| Butyl acetate | 10.00 | 10.00 | 10.00 | 10.00 | 10.00 |

TABLE 2-continued

Composition of the clearcoat compositions in parts by weight

|  | Comp. ex. 1 | Comp. ex. 2 | Inv. ex. 1 | Inv. ex. 2 | Inv. ex. 3 |
|---|---|---|---|---|---|
| Flow control agent, 10% strength in butyl acetate [3] | 1.50 | 1.50 | 1.50 | 1.50 | 1.50 |
| Light stabilizer [4] | 1.00 | 1.00 | 1.00 | 1.00 | 1.00 |
| Light stabilizer [5] | 1.00 | 1.00 | 1.00 | 1.00 | 1.00 |
| Jeffamine ® T 403 [1] | 15.60 | 13.26 | 12.50 | 10.60 | |
| Amine mixture (A1) [2] | | | | | 4.80 |
| Sum total | 129.10 | 126.76 | 133.00 | 131.1 | 125.3 |
| Carbonate:amine [6] | 1:1 | 1:0.85 | 1:1 | 1:0.85 | 1:1 |

Key to table 2:
[1] commercial polyoxypropylene ether triamine having an AHEW (amine hydrogen equivalent wt.) of 81 g/eq, from Huntsman
[2] mixture of diethylenetriamine:dimethylpropylene-diamine:isophoronediamine = 1:1:1
[3] commercial flow control agent based on a polyether-modified polydimethylsiloxane, 10% strength in butyl acetate
[4] commercial light stabilizer based on a UV absorber based on benzotriazole, 95% strength in 1-methoxy-2-propyl acetate
[5] commercial light stabilizer based on a sterically hindered amine (HALS), 100% form
[6] carbonate to amine ratio: calculated from the molar ratio of carbonate groups to primary amine groups The clearcoat compositions of examples 1 to 3 and those of comparative examples C1 and C2 were applied to steel panels which beforehand had been coated with a commercial baked cathodic electrocoat, with a commercial conventional baked primer-surfacer, and with a white waterborne basecoat material, which was dried at 80° C. for 10 minutes. The resulting coating was then cured for 30 minutes at 100° C. and the resulting coating was subjected to the tests indicated in table 3. In addition, the yellowing was determined directly after baking, after oven storage for 7 days at 100° C., and after oven storage of 1 h at 150° C. The test results are each set out in table 3.

TABLE 3

Test results of the coatings of examples 1 to 3 and of comparative examples C1 and C2

|  | Comp. ex. 1 | Comp. ex. 2 | Inv. ex. 1 | Inv. ex. 2 | Inv. ex. 3 |
|---|---|---|---|---|---|
| Clearcoat curing | 30 min 100° C. | 30 min 100° C. | 30 min 100° C. | 30 min 100° C. | 30 min 100° C. |
| Surface [1] | clear, smooth | clear, smooth | clear, smooth | clear, smooth | clear, smooth |
| Surface hardness [2] | soft | soft | hard | hard | hard |
| Delta B 45° after curing [3] | 1.5 | 1.1 | −0.4 | −0.1 | −0.5 |
| Delta B 45° after oven 7 days 100° C. [3] | 9.7 | 10.3 | 4.6 | 4.0 | 2.6 |
| Delta B 45° after oven 1 h 150° C. [3] | 9.0 | 8.8 | 3.7 | 3.3 | 2.9 |
| Delta B 45° after oven 1 h 150° C. and 24 h sun [4] | 3.4 | 3.4 | 0.4 | 0.0 | 0.5 |
| % residual gloss after 1000 h WOM-CAM-180 Q/B [5] | —[6] | 76 | 95 | 100 | 95 |

Key to table 3:
[1] The surface was assessed visually.
[2] The hardness was assessed with the fingernail.
[3] The color values were determined using the MA 68 II instrument from X-Rite.
[4] The daylight exposure here is simulated using the so-called Suntest with daylight filter, in which a high-pressure xenon lamp as radiation source mimics the distribution and intensity of sunlight radiation in the wavelength range from 270 to 800 nm under laboratory conditions. "SUNTEST" instrument from Heraeus Instruments, radiation source: 1 high-pressure xenon lamp, 1800 watts, air-cooled, Suprax filter
[5] Test apparatus: Weather-Ometer Ci 65 A or Ci 5000 from Atlas Radiation source: 1 high-pressure xenon lamp, water-cooled
[6] The sample was removed from the test after 750 hours, owing to highly attacked and swollen surface Discussion of the Test Results:

Surprisingly it was found that in accordance with inventive examples 1 to 3, the activated, carbonate group-containing compounds (B-E) used in accordance with the invention, together with aminic hardeners, lead to coatings having much less yellowing than the coatings of comparative examples C1 and C2, produced using the conventional glycerol carbonate acrylate copolymer.

The results in table 3 clearly show, furthermore, that in the case of overbaking, with the coating compositions of the invention, directly after baking, the extremely low yellowing of delta B<1 that is required by the automobile manufacturers is not achieved. Surprisingly, however, it was found that the thermal yellowing of the inventive coatings of examples 1 to 3 is fully reversible by exposure to daylight within 24 hours, hence allowing the coating material compositions of the invention to be employed for automobile finishing, whereas UV light, although reducing the yellowing of the coatings, does not achieve complete reversibility, as shown by comparative examples C1 and C2. In addition, the inventive coating compositions of examples 1 to 3 still exhibit very good gloss values, of more than 95% residual gloss, after 1000 hours of accelerated weathering. In contrast, comparative example C1 does not reach 1000 hours, and comparative example C2 is already showing a considerable drop in gloss (only 76% residual gloss) after 1000 hours.

The invention claimed is:

1. A nonaqueous coating material composition, comprising
(A) at least one compound (A) having at least two amino groups, and
(B) at least one oligomeric and/or polymeric compound (B) having at least two alkylidene-1,3-dioxolan-2-one groups,
wherein the compound (B) is obtained by using
i. at least one monomer (B1) of formula (I)

$$\underset{R^1\ R^2}{\overset{O}{\underset{\|}{O}}}\!\!\diagdown\!\!\diagup\!\!=\!\mathrm{CR}^3\!-\!\mathrm{A}\!-\!\mathrm{X}\!-\!\mathrm{Z}\!-\!\mathrm{Y}\!\diagdown\!\!\overset{R^5}{\underset{R^4}{\diagdown}}\!\!R^6 \qquad (I)$$

where
$R^1$, $R^2$ independently of one another are hydrogen, $C_1$-$C_6$ alkyl, $C_1$-$C_4$ alkoxy-$C_1$-$C_4$ alkyl, $C_5$-$C_6$ cycloalkyl, phenyl or phenyl-$C_1$-$C_4$ alkyl;
$R^3$ is hydrogen, $C_1$-$C_6$ alkyl, $C_1$-$C_4$ alkoxy-$C_1$-$C_4$ alkyl, $C_5$-$C_6$ cycloalkyl, phenyl, or phenyl-$C_1$-$C_4$ alkyl;
$R^4$ is hydrogen, $C_1$-$C_4$ alkyl, $CH_2COOR^8$, phenyl or phenyl-$C_1$-$C_4$ alkyl;
$R^5$, $R^6$ independently of one another are hydrogen or $C_1$-$C_4$ alkyl, or one $R^5$ and $R^6$ is optionally $COOR^8$ or $CH_2COOR^8$;
A is a chemical bond or $C_1$-$C_4$ alkanediyl;
X is O or $NR^7$;
Z is a chemical bond, $PO_2$, $SO_2$, or C=O;
Y is a chemical bond, $CH_2$, or $CHCH_3$;

$R^7$ where present is $C_1$-$C_6$ alkyl; and
$R^8$ where present is hydrogen or $C_1$-$C_6$ alkyl;
and
ii. at least two different comonomers (B2) and (B3) which are each different from the monomer (B1).

2. The coating material composition as claimed in claim 1, wherein $R^1$ and $R^2$ are each hydrogen or $C_1$-$C_6$ alkyl, and/or wherein $R^3$ is hydrogen.

3. The coating material composition as claimed in claim 1, wherein A is ethanediyl, X is O, Z is C=O, and Y is a chemical bond.

4. The coating material composition as claimed in claim 1, wherein the compound (B) is obtained by using from 2 to 6 monoethylenically unsaturated comonomers (B2) to (B7), each of which is different from one another.

5. The coating material composition as claimed in claim 1, wherein the comonomers different from (B1) are selected from the group consisting of a vinylaromatic compound, an ester of a monoethylenically unsaturated aliphatic monocarboxylic acid with an aliphatic alkanol, an ester of a monoethylenically unsaturated aliphatic monocarboxylic acid with a cycloaliphatic alkanol, and a mixture of at least two of these comonomers.

6. The coating material composition as claimed in claim 1, wherein the comonomers different from (B1) are selected from the group consisting of an ester of a monoethylenically unsaturated aliphatic C3-C6 monocarboxylic acid with a C1-C8 alkanol, an ester of a monoethylenically unsaturated aliphatic C3-C6 monocarboxylic acid with a C5-C8 cycloalkanol, or a vinylaromatic hydrocarbon, or a mixture of at least 2 of these comonomers.

7. The coating material composition as claimed in claim 1, wherein the comonomers used comprise a mixture of a vinylaromatic hydrocarbon and 2 to 4 different alkyl esters of C1-C8 alkanols with acrylic acid and/or with methacrylic acid.

8. The coating material composition as claimed in claim 1, wherein the compound (B) is obtained by using
10 to 80 wt % of monomer (B1)
and
20 to 90 wt % of at least two different comonomers (B2), (B3), optionally (B4), optionally (B5) to optionally (Bn), each different from the monomer (B1),
the weight % figures being based in each case on the total weight of all the monomers (B1) plus (B2) plus (B3) plus optionally further comonomers (B4) plus (B5) to (Bn) that are used for preparing the compound (B).

9. The coating material composition as claimed in claim 1, wherein the amino group-containing compound (A) has on average at least two primary and/or secondary amino groups per molecule.

10. The coating material composition as claimed in claim 1, wherein the amino group-containing compound (A) is selected from the group consisting of a (cyclo)aliphatic diamine, a (cyclo)aliphatic triamine and a polyetheramine.

11. The coating material composition as claimed in claim 1, wherein the amino group-containing compound (A) is selected from the group consisting of a polyetheramine, a mixture of different aliphatic diamines and/or aliphatic triamines, a mixture of different cycloaliphatic diamines and/or cycloaliphatic triamines, and a mixture of different aliphatic diamines and/or aliphatic triamines with cycloaliphatic diamines and/or cycloaliphatic triamines.

12. A multistage coating method, comprising
applying, to an optionally precoated substrate, a pigmented basecoat film and thereafter a film of the coating material composition as claimed in claim 1.

13. The multistage coating method as claimed in claim 12, wherein application of the pigmented basecoat film is followed by drying of the applied basecoat first at a temperature of from room temperature to 80° C., and application of the coating material composition is followed by curing at a temperature of from 20 to 200° C., for a time of from one minute up to 10 hours.

14. An automotive OEM finishing, a finishing of a part for installation in or on an automobile, and/or of a commercial vehicle, and automotive refinish, obtained by the method as claimed in claim 12.

15. A coating method, comprising
applying the coating material composition as claimed in claim 1 to a surface as a clearcoat for an automotive OEM finishing, a finishing of a part for installation in or on an automobile, and/or of a commercial vehicle, and automotive refinish.

16. A multicoat effect and/or color paint system comprising at least one pigmented basecoat film and at least one clearcoat film disposed thereon, wherein the clearcoat film is produced from the coating material composition as claimed in claim 1.

* * * * *